(12) United States Patent
Uyeki

(10) Patent No.: US 9,987,940 B2
(45) Date of Patent: Jun. 5, 2018

(54) PRIORITY BASED VEHICLE CONTROL STRATEGY

(71) Applicant: Honda Motor Co., Ltd., Minato-ku, Tokyo (JP)

(72) Inventor: Robert Uyeki, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 782 days.

(21) Appl. No.: 14/487,643

(22) Filed: Sep. 16, 2014

(65) Prior Publication Data

US 2016/0075247 A1   Mar. 17, 2016

(51) Int. Cl.
| | |
|---|---|
| *B60L 11/18* | (2006.01) |
| *H04W 4/12* | (2009.01) |
| *H04W 4/02* | (2018.01) |
| *H02J 3/00* | (2006.01) |
| *H02J 7/00* | (2006.01) |
| *H02J 7/34* | (2006.01) |
| *H02J 3/32* | (2006.01) |

(52) U.S. Cl.
CPC ....... *B60L 11/1842* (2013.01); *B60L 11/1824* (2013.01); *B60L 11/1851* (2013.01); *H02J 3/00* (2013.01); *H02J 7/0027* (2013.01); *H02J 7/0029* (2013.01); *H02J 7/0063* (2013.01); *H02J 7/34* (2013.01); *H04W 4/02* (2013.01); *H04W 4/12* (2013.01); *H02J 3/32* (2013.01); *H02J 2003/007* (2013.01); *H02J 2007/004* (2013.01); *H02J 2007/0067* (2013.01); *Y02D 70/00* (2018.01); *Y02D 70/164* (2018.01); *Y02E 60/76* (2013.01); *Y02T 10/7055* (2013.01); *Y04S 40/22* (2013.01)

(58) Field of Classification Search
None
See application file for complete search history.

(56) References Cited

U.S. PATENT DOCUMENTS

| | | | |
|---|---|---|---|
| 7,679,336 | B2 | 3/2010 | Gale et al. |
| 7,747,739 | B2 | 6/2010 | Bridges et al. |
| 7,844,370 | B2 | 11/2010 | Pollack et al. |
| 7,956,570 | B2 | 6/2011 | Lowenthal et al. |
| 7,991,665 | B2 | 8/2011 | Hafner et al. |
| 8,019,483 | B2 | 9/2011 | Keefe |
| 8,106,627 | B1 | 1/2012 | Rossi |
| 8,319,358 | B2 | 11/2012 | Curry et al. |
| 8,324,859 | B2 | 12/2012 | Rossi |
| 8,346,401 | B2 | 1/2013 | Pollack et al. |

(Continued)

FOREIGN PATENT DOCUMENTS

| | | |
|---|---|---|
| WO | WO2012012008 | 1/2012 |
| WO | WO2013024484 | 2/2013 |

*Primary Examiner* — Ryan Rink
*Assistant Examiner* — Paul A Castro
(74) *Attorney, Agent, or Firm* — Arent Fox LLP

(57) ABSTRACT

A method for sending a vehicle-to-grid (V2G) request that includes receiving a V2G request for a specific geographical region; determining which of a plurality of vehicles are in the specific geographic region; determining a subset of the plurality of vehicles located in the specific geographic region that meet at least one criteria to join the V2G request, wherein the at least one criteria uses historical data of the plurality of vehicles to reduce battery degradation of the plurality of vehicles; and sending a signal to the subset of the plurality of vehicles to join the V2G request.

19 Claims, 7 Drawing Sheets

(56) References Cited

U.S. PATENT DOCUMENTS

| | | | |
|---|---|---|---|
| 8,354,913 B2 | 1/2013 | Solomon et al. | |
| 8,450,967 B2 | 5/2013 | Lowenthal et al. | |
| 8,509,976 B2 | 8/2013 | Kempton | |
| 8,639,409 B2 | 1/2014 | Ramaswamy et al. | |
| 2012/0200260 A1 | 8/2012 | Karner et al. | |
| 2012/0249068 A1 | 10/2012 | Ishida | |
| 2013/0020992 A1 | 1/2013 | Wu et al. | |
| 2013/0179061 A1* | 7/2013 | Gadh | B60L 11/1842 701/123 |
| 2013/0211988 A1* | 8/2013 | Dorn | B60L 11/1838 705/35 |
| 2013/0241485 A1* | 9/2013 | Snyder | B60L 11/1809 320/109 |

* cited by examiner

| Date | Time | Vehicle ID | Location | Start SOC | Estimated charge time | Approve V2G |
|---|---|---|---|---|---|---|
| 1/26 | 1:32 PM | H9857 | Lat/long | 69% | 62 minutes | Yes |
| 1/26 | 1:32 PM | T9210 | Lat/long | 59% | 83 minutes | Yes |
| 1/26 | 1:32 PM | N2109 | Lat/long | 50% | 102 minutes | No |
| 1/26 | 1:32 PM | C2120 | Lat/long | 18% | 168 minutes | No |

FIG. 4

| Date | Time | Vehicle ID | Location | Charge Cycles this Month | Approve V2G |
|---|---|---|---|---|---|
| 1/26 | 1:32 PM | H9857 | Lat/long | 10 | Yes |
| 1/26 | 1:32 PM | T9210 | Lat/long | 25 | Yes |
| 1/26 | 1:32 PM | N2109 | Lat/long | 30 | No |
| 1/26 | 1:32 PM | C2120 | Lat/long | 35 | No |

FIG. 5

| Date | Vehicle ID | Maximum range based on SOC | Location | Start SOC | Estimated charge time | Approve V2G |
|---|---|---|---|---|---|---|
| 1/26 | H9857 | 100 miles | Lat/long | 69% | 62 minutes | Yes |
| 1/26 | T9210 | 95 miles | Lat/long | 59% | 83 minutes | Yes |
| 1/26 | N2109 | 75 miles | Lat/long | 50% | 102 minutes | No |
| 1/26 | C2120 | 105 miles | Lat/long | 70% | 168 minutes | No |

FIG. 8

| Date | Vehicle ID | Maximum range based on SOC | Location | Start SOC | Max V2G Cycle/mo/ytd | Enable V2G |
|---|---|---|---|---|---|---|
| 1/26 | H9857 | 100 miles | Lat/long | 69% | none | Yes |
| 1/26 | T9210 | 95 miles | Lat/long | 59% | Month - Yes YTD - No | No |
| 1/26 | N2109 | 75 miles | Lat/long | 50% | No | No |
| 1/26 | C2120 | 105 miles | Lat/long | 70% | Month - Yes YTD - No | No |

FIG. 9

| Month | Vehicle ID | Location | Ambient Temp | Solar | Discharge Amount (kwh) | V2G Cycles | Degradation | Total V2G | Total Deg |
|---|---|---|---|---|---|---|---|---|---|
| Jan | H9857 | Lat/long | 70°F | | $N_1$ kwh | 10 | 0% | 100 | 1% |
| Jan | T9210 | Lat/long | 71°F | | $N_2$ kwh | 25 | 0.5% | 249 | 2.5% |
| Jan | N2109 | Lat/long | 73°F | | $N_3$ kwh | 50 | 1% | 300 | 4% |
| Jan | C2120 | Lat/long | 75°F | | $N_4$ kwh | 100 | 2% | 500 | 10% |
| Feb | | | | | | | | | |

FIG. 10

PRIORITY BASED VEHICLE CONTROL STRATEGY

TECHNICAL FIELD

The present application in general relates to vehicles, and more specifically, to a method and system for a priority based strategy to receive vehicle-to-grid (V2G) request based on vehicle location and minimizing battery pack degradation.

BACKGROUND

Vehicle-to-grid (V2G) is a term which may be used to describe a system and or method in which plug-in electric vehicles, such as battery electric cars (BEVs) and plug-in hybrids (PHEVs) (hereinafter PHEVs), communicate with the power grid in order to be charged by the power grid or to provide power back to the power grid. V2G systems may utilize the excess battery storage capacity in the PHEVs to help stabilize the power grid. For example, V2G systems may communicate with a PHEV so that the PHEV may be recharged during off-peak hours at cheaper rates while helping to absorb excess night time electrical generation when overall demand is lower, where the vehicles serve as a distributed battery storage system to buffer power. In addition, V2G systems may communicate with PHEVs to send excess battery storage capacity in the PHEVs back to the power grid. This may help to stabilize the power grid during high-peak times and minimize potential rolling blackouts during high-peak times. A further benefit of using the electrical storage capabilities of electric vehicles is the potential mitigation to build additional generating plants to handle peak loading.

Local and federal government mandates have established guidelines for increasing the use of renewable energy sources. These mandates may have the potential to disrupt the quality of the electrical supply grid. For example, as more consumers use PHEVs to lessen the use of fossil fuels, the load on the power grid may increase as more PHEVs connect to the power grid in order to be charged. Furthermore, utilities have concerns that the increasing sale of PHEVs and clustering of PHEVs in specific geographic areas may create excessive loading to the electrical grid. Thus utilities may be interested in using electric vehicles within the V2G system framework as a possible stabilizing method for the electrical grid by providing power back to the power grid.

While there are many potential benefits to utilizing electric vehicles in a V2G system, there may be potential costs that may need to be weighed. Excessive charge and discharge cycling of an electric vehicle battery may reduce the useable life of the battery, and may lead to premature wear and warranty issues. Charging habits, or depth of discharge, may also directly affect how long the battery lasts. By avoiding fully depleting a vehicle's battery and charging frequently, the stress on a battery is reduced extending its life cycle. It would thus be desirable to provide a device and method that overcomes battery degradation in V2G systems.

SUMMARY

In accordance with one embodiment, a method for sending a vehicle-to-grid (V2G) request comprises: receiving a V2G request for a specific geographical region; determining which of a plurality of vehicles are in the specific geographic region; determining a subset of the plurality of vehicles located in the specific geographic region that meet at least one criteria to join the V2G request, wherein the at least one criteria is established to reduce battery degradation of the plurality of vehicles, wherein historical data of the plurality of vehicles is used to determine the subset; and sending a signal to the subset of the plurality of vehicles to join the V2G request.

In accordance with one embodiment, a system for vehicle-to-grid (V2G) priority based selection has a network configured for communication between one or more utilities, a vehicle company, and a plurality of vehicles manufactured by the vehicle company. At least one server with a database contains information for the plurality of vehicles. The at least one server has a processor configured to access the database and to execute a set of program instructions causing the processor to: receive a V2G request for a specific geographical region; determine a subset of a plurality of vehicles that meet a plurality of criteria to join the V2G request, wherein the plurality of criteria are guidelines established to reduce battery degradation, wherein current and historical data of the plurality of vehicles determines eligibility for the V2G request; and send a signal to the subset of the plurality of electric vehicles to join the V2G request.

In accordance with one embodiment, a method for a vehicle-to-grid (V2G) priority based selection comprising: receiving a request for a plurality of electric vehicles manufactured by a vehicle company to join a V2G based on a geographic region; reviewing a database of last known vehicle status to determine a last known position for each of the plurality of electric vehicles in the database; determining which of the plurality of electric vehicles are in the geographic area specified in the request to join the V2G; determining a subset of the plurality of vehicles that are in the geographic area that meet a plurality of criteria established by the vehicle company to reduce battery degradation, wherein current and historical data is used to determine the subset; sending a signal to the subset to join the V2G; and communicating to at least one of the plurality of vehicles to limit V2G participation based on the current and historical data of the at least one of the plurality of vehicles to prevent further battery degradation.

BRIEF DESCRIPTION OF THE DRAWINGS

The present application is further detailed with respect to the following drawings. These figures are not intended to limit the scope of the present application but rather illustrate certain attributes thereof.

FIG. 4 is an exemplary table generated by a server depicted in FIG. 1 showing vehicle data which is used as criteria for priority based strategy for handling V2G requests according to one aspect of the present application;

FIG. 5 is an exemplary table generated by the server depicted in FIG. 1 showing vehicle data which is used as criteria for priority based strategy for handling V2G requests according to one aspect of the present application;

FIG. 8 is an exemplary table generated by the server depicted in FIG. 1 showing vehicle data which is used as criteria for priority based strategy for handling V2G requests according to one aspect of the present application;

FIG. 9 is an exemplary table generated by the server depicted in FIG. 1 showing vehicle data which is used as criteria for priority based strategy for handling V2G requests according to one aspect of the present application; and FIG. 10 is an exemplary table generated by the server depicted in FIG. 1 showing vehicle data which is used as criteria for priority based strategy for handling V2G requests according to one aspect of the present application.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure Embodiments of the exemplary method and system allow for more precise control of which vehicles participate in a Vehicle to Grid (V2G), protect a vehicle's battery pack from premature degradation, decrease the inconvenience to the customer of being volunteers, allow other vehicle owners to participate, and geographically spread out participating vehicles to reduce utility loads, etc. The method and system allows vehicle manufacturers to predict the amount and volume of new V2G electrical loads that may be contributed to the grid as more electric vehicles are introduced into and taken off the market, and proactively communicate to the electric producing utilities how much energy is available for charge/discharge.

Figure 1:
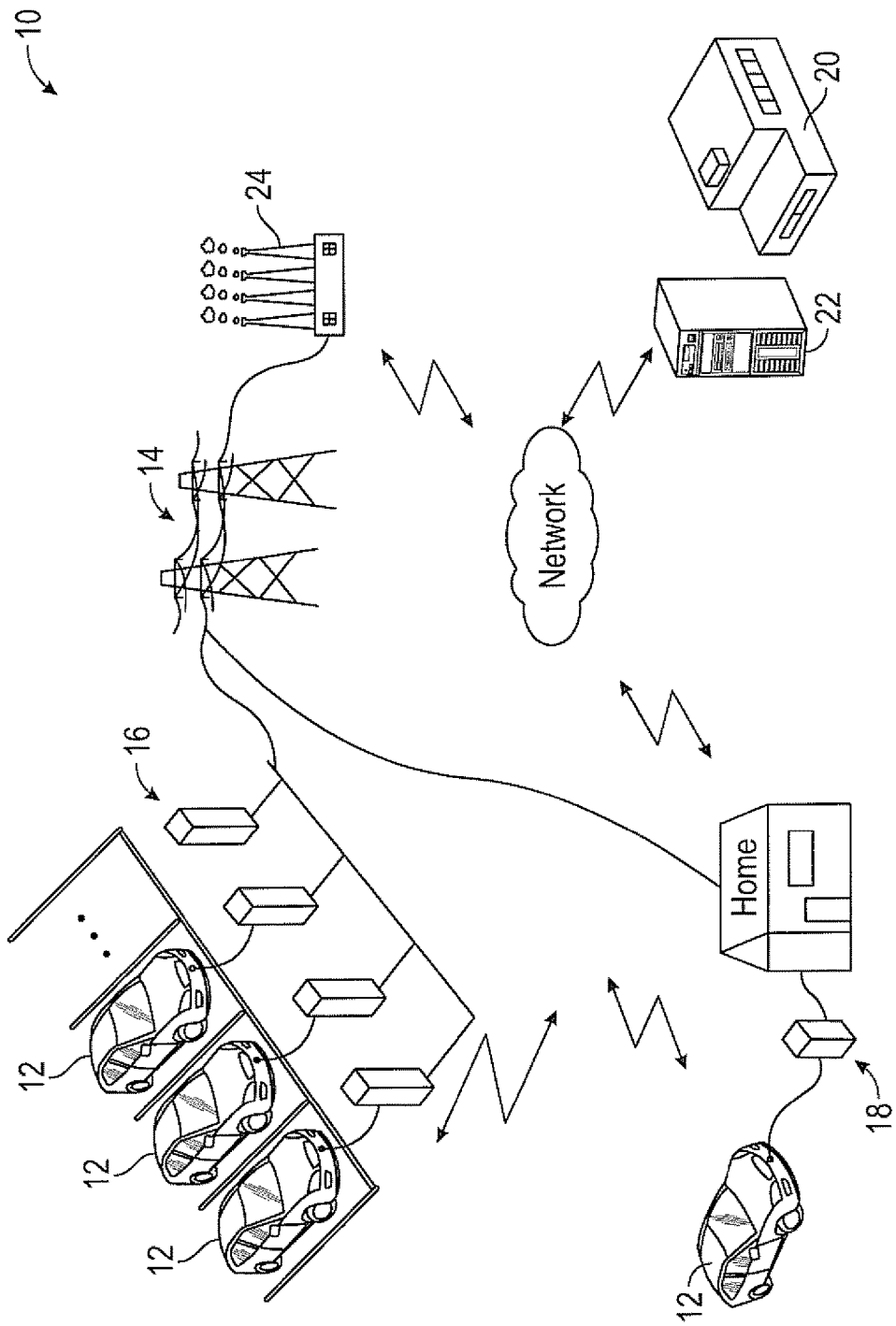
FIG. 1 is an exemplary system for a priority based handling of V2G requests for vehicles according to one aspect of the present application.

Referring to FIG. 1, an exemplary system 10 for a priority based handling of V2G requests. The system 10 may provide a priority based strategy to receive a utility issued V2G request, identify possible vehicles via global positioning satellite (GPS) data to potentially participate in the V2G request, and determine which vehicles based on criteria such as minimal battery degradation, state of charge (SOC), and quantity of charge/discharge cycles to battery pack health should participate in V2G. The battery lifecycle/degradation may be based on historical data and prediction methodologies.

In the system 10, vehicles 12 that may be participating in the V2G request may provide energy stored in battery packs of the vehicles 12 back to an electrical grid 14. Vehicles 12 may provide the stored energy back to the electrical grid 14 through a charging station 16 which may be publically operated, privately operated or operated by any other $3^{rd}$ party. The vehicles 12 may provide the stored energy back to the electrical grid 14 through a home charging station 18.

The vehicle 12 may transmit data related to the operation of the vehicle 12. For example, the vehicle 12 may transmit data related to the current location of the vehicle 12, the state of charge of the vehicle 12, charge history of the vehicle 12, battery pack degradation, or other operating conditions of the vehicle 12. The data may be transmitted in real time or at predetermined times such as when the vehicle 12 is turned off or when the vehicle 12 is charging at a charging station 16 or home charging station 18. The data related to the operation of the vehicle 12 may be transmitted to one or more monitoring facilities 20. The monitoring facilities 20 or other parties may transmit data to the vehicle 12 such as V2G request as will be discussed below.

In accordance with one exemplary embodiment, when the vehicle 12 is connected to the home charging station 18, the data may be downloaded to the home charging station 18. The home charging station 18 may transmit the downloaded data to the monitoring facilities 20. Alternatively, when the vehicle 12 is connected to the home charging station 18, the vehicle 12 may transmit the data through a telematics system of the vehicle 12 to the monitoring facilities 20. Similarly, when the vehicle 12 is connected to the charging station 16, the data may be downloaded to the charging station 16 which may transmit the downloaded data to the monitoring facilities 20. Alternatively, when the vehicle 12 is connected to the charging station 16, the vehicle 12 may transmit the data through a telematics system of the vehicle 12 to the monitoring facilities 20.

The data may be transmitted via a network. The network may include a fixed wire line network, cable and fiber optics, over the air broadcasts, cellular, satellite, local area network (LAN), wide area network (WAN), or global network (e.g., Internet). For example, if the data is downloaded to the home charging station 18, the data may be transmitted to the monitoring facilities 20 via a fixed wired telephone network. If the data is being transmitted through a telematics system of the vehicle 12 to the monitoring facilities 20, a wireless network such as a cellular or satellite network may be used.

The monitoring facilities 20 may be used to store and or analyze the data collected. The data may be stored and/or analyzed on a computer system and/or a server 22 (hereinafter server 22). While FIG. 1 shows one monitoring facility 20, any number of monitoring facilities 20 may be used. The monitoring facilities 20 may be in communication with each other. In accordance with one embodiment, the monitoring facilities 20 may be networked together to share the data received via wired or wireless communication networks.

The server 22 may have a processor. The processor may be implemented in hardware, software or a combination thereof. The processor may store a computer program or other programming instructions associated with a memory to control the operation of the server 22 and to analyze the data received. The data structures and code within the software in which the present application may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor may comprise various computing elements, such as integrated circuits, microcontrollers, microprocessors, programmable logic devices, etc., alone or in combination to perform the operations described herein.

The monitoring facilities 20 may be operated by an original equipment manufacturer (OEM) of the vehicle 12, utility companies, or a third party. When a utility company 24 has a V2G request for power to be uploaded to the power grid, the utility company 24 may notify the monitoring facilities 20 of the request. The server 22 may analyze the data in order to determine which vehicles 12 may receive the V2G request to upload power back to the electrical grid 14. The server 22 may be programmed to use a priority based strategy to receive V2G request based on vehicle location and minimizing of battery pack degradation as will be described below.

Figure 2:
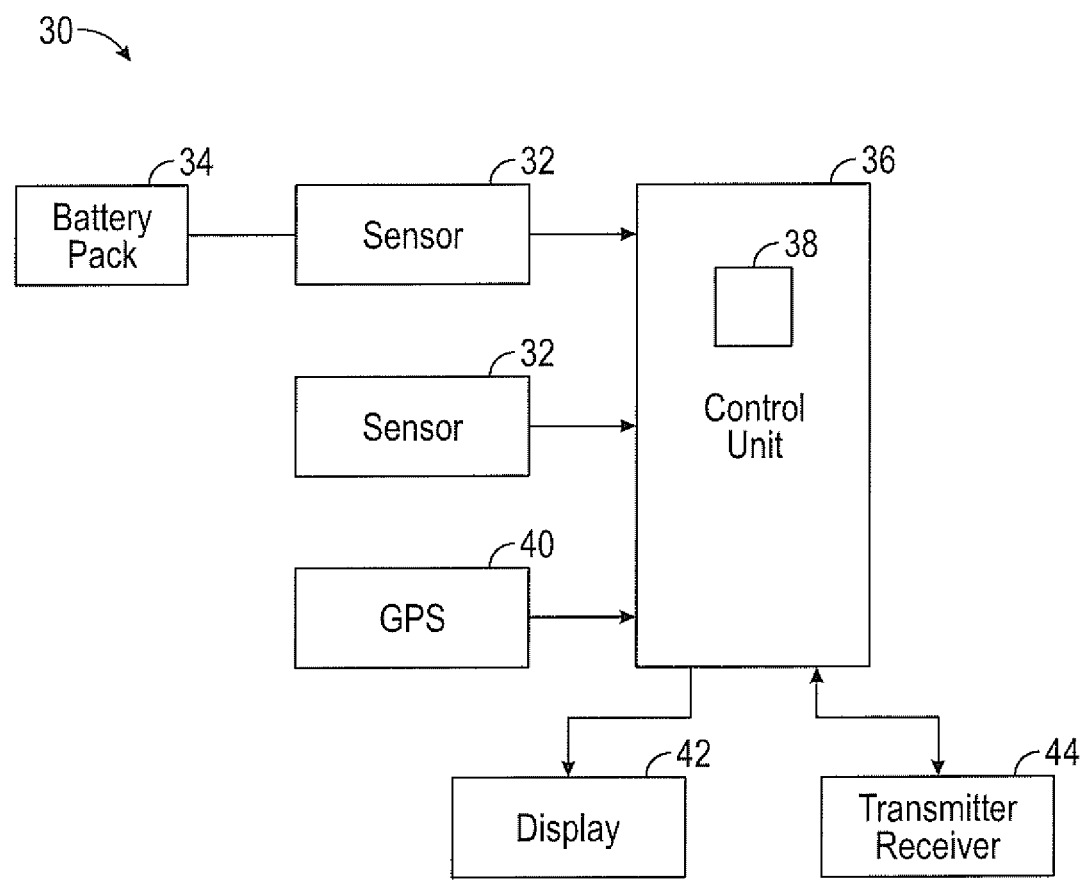
FIG. 2 is an illustrative control system of the vehicles depicted in FIG. 1 in accordance with one aspect of the present application.

Referring now to FIG. 2, the vehicles 12 (FIG. 1) participating, in the system 10 (FIG. 1) may have a control system 30. The control system 30 may have one or more monitoring sensors 32. One of the monitoring sensors 32 may be coupled to a battery pack 34 of the vehicle 12. The monitoring sensors 32 may be used to monitoring the current charge state of charge of the battery pack 34, charging status of the battery pack 34, operating conditions of the battery pack 34 such as those that may affect battery degradation, as well as operating statuses of other systems within the vehicle 12. The monitoring sensors 32 may be coupled to a control unit 36.

The control unit 36 may have a processor 38. The processor 38 may store a computer program or other programming instructions associated with a memory to control the operation of the control system 30 and to analyze the data received from the sensors 32. For example, the processor 38 may be programmed to analyze the data received from the sensors 32 to calculate the degradation of the battery pack 34. The data structures and code within the software in which the present application may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 38 may comprise various computing elements, such as integrated circuits, microcontrollers, microprocessors, programmable logic devices, etc., alone or in combination to perform the operations described herein.

A Global Positioning Satellite (GPS) unit 40 may be coupled to the control unit 36. The GPS unit 40 may be used to determine a current location of the vehicle 12. A display 42 may be coupled to the control unit 36. The display 42 may be used to show a graphical representation of a map and position of the vehicle as indicated by the GPS unit 38, information related to operating conditions of one or more systems within the vehicle 12, or other information related to operation of the vehicle 12.

A transmitter/receiver 44 may be coupled to the control unit 36. The transmitter/receiver 44 may be used to transmit data related to the operation of the vehicle 12 collected by the monitoring sensors 32 and or the GPS unit 28. For example, the vehicle 12 may transmit data related to the current location of the vehicle 12, the state of charge of the vehicle 12, charge history of the vehicle 12, or other operating conditions of the vehicle 12. The transmitter/receiver 44 may receive data. The transmitter/receiver 44 may be used to receive V2G request sent by the monitoring facilities 20. The V2G request may be shown on the display 42. Alternatively, if the user of the vehicle 12 is away from the vehicle 12, the V2G request may be sent to a mobile device of the user. The V2G request may be sent as a text message, email, instant message or other communication means to the mobile device.

Figure 3:
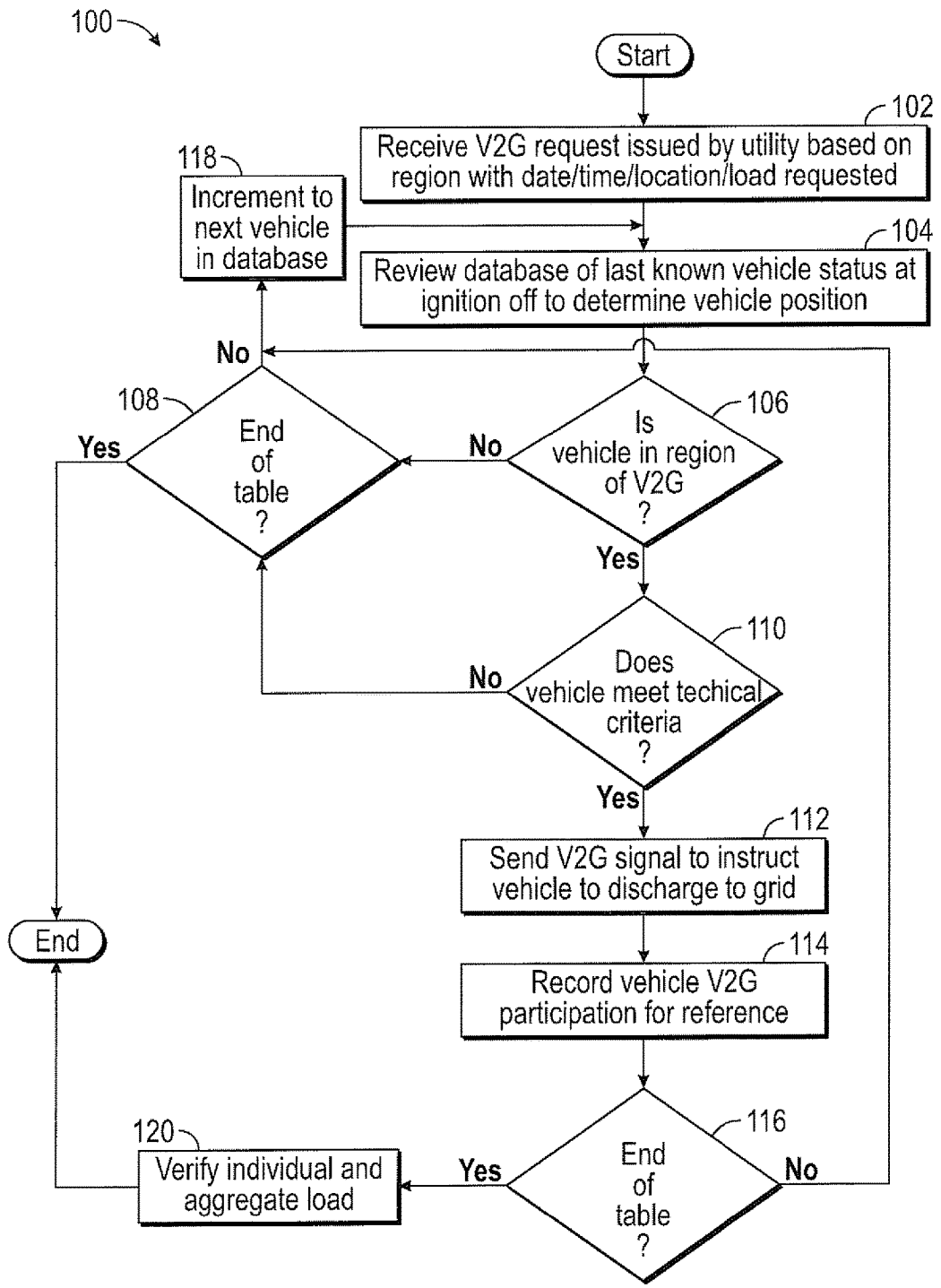
FIG. 3 is an exemplary flowchart depicting a priority based strategy for handling V2G requests for vehicles according to one aspect of the present application.

Referring now to FIG. 3, a flowchart is shown of a priority based strategy for handling V2G requests for vehicles 12 (FIG. 1) according to one exemplary embodiment. The method starts (block 102) with a V2G request from the utility company 24 (FIG. 1). The V2G request may be sent to the monitoring facilities 20 (FIG. 1). As stated above, the monitoring facilities 20 may be a vehicle manufacturer (original equipment manufacturer—OEM), a vehicle leasing company or fleet manager, or third party group (hereinafter OEM). The OEM may receive a request for vehicles 12 manufactured by the vehicle company to potentially join a V2G request based on a geographic region with a date, time, and amount of energy (load) requested to be supplied to the grid 14 (FIG. 1) from the vehicles 12.

In response to the received request, the OEM may review data that has been collected by monitoring facilities 20 in the geographical region where the request was made. The OEM may review a database of a last known vehicle status to determine the last known positions of each of the vehicles in the database (block 104). In accordance with one embodiment, the last known position of each of the vehicles in the database may be based on when the vehicle 12 was shut down (ignition oft).

A determination (block 106) may be made if each of the vehicles 12 are in the geographic area specified in the request to join the V2G. The determination may be made in different manners. For example, the V2G request may be for a specific area defined by a boundary. A determination may be made to see if the last known location of the vehicle is within the boundary defined by the V2G request. If the vehicle 12 is located within the boundary, then the vehicle 12 may be eligible to participate in the V2G request. If the vehicle 12 is not in the area (decision block 106 is No), a determination is made as to whether there are other vehicles 12 in a lookup table of vehicles 12 in the database that may not been reached (decision block 108 is No), the review of the database may be incremented (block 118) to the next vehicle ID in the database to determine that vehicle's position (block 104). If the vehicle 12 is determined to be in the region of the V2G request (decision block 110), a determination may be made if the vehicle 12 meets certain criteria to be permitted to join the V2G. These other criteria will be discussed below. In general, just being in the defined region may not warrant the vehicle 12 from participating in the V2G request since information related to the condition of the battery pack 34 (FIG. 2) is not being considered.

If the vehicle 12 does not meet the criteria or requirement for participating in the V2G (decision block 110 is No), and the end of the lookup table of vehicles 12 in the database has not been reached (decision block 108 is No), the review of the database may be incremented (block 118) to the next vehicle ID in the database to determine that vehicle's position (block 104). If the vehicle 12 meets the criteria or requirements set by the OEM (decision block 110 is Yes), the OEM may send a V2G signal (block 112) to instruct the vehicle 12 to discharge stored energy from the battery pack 34 of the vehicle 12 to the electrical grid 14, and may make a record of the vehicle's participation in the V2G request (block 114). If the end of the database table of vehicles 12 has not been reached (decision block 116 is No), the review of the database may be incremented (block 118) to the next vehicle ID in the database to determine that vehicle's position (block 104). If the end of the database table has been reached (decision block 116 is Yes), a verification of the individual participating vehicle contributions to the electric grid may be made, as well as the aggregate contribution or load (block 120), and the process terminates.

In the priority based strategy for handling V2G requests for vehicles 12, a utility company 24 may send a V2G request signal in real-time or one or more days ahead to the OEM. For example, the temperature in a particular area may be forecasted to be unseasonably high for the next 2-3 days. In this case, the OEM may send the V2G request one or more days in advance to prepare for the higher energy demands that may come with hotter than normal temperatures.

In decision block 110, other criteria besides geographic location may be used to determine if the vehicle 12 may be selected to participate in the V2G request. In accordance with one embodiment, the criteria for determining whether a specific vehicle 12 may be eligible to participate in the V2G request may be based on a combination of the position of the vehicle 12 based on GPS coordinates (latitude and longitude) to determine if the vehicle 12 is in the utility service area and the State of Charge (SOC) of the vehicle 12 located in the V2G request area.

In the embodiment shown in FIG. 4, the minimum required SOC may be at least 50% of a full charge in order to be eligible to participate in the V2G request. In alternative embodiments the required SOC threshold may be higher or lower than 50%. If the vehicle 12 is currently charging, an estimate of the present charge amount or percentage of full charge may be based on time elapsed from ignition off and the rate of charging, i.e., level 1 (120V) or level 2 (240V) charge, etc. to determine current SOC without having to ping the vehicle. As depicted in FIG. 4, which may be representative of the database, the vehicles identified as N2109 and C2120 are at 50% and 18%, respectively for SOC. Thus, based on the criteria of at least 50% of a full charge in order to be eligible to participate in the V2G request, the vehicles identified as H9857 and T9210 may be eligible to participate, while the vehicles identified as N2109 and C2120 may not be eligible to participate in the V2G request.

Discharge data related to the battery pack 34 of the vehicle 12 may be taken into consideration to determine if the vehicle 12 may be selected to participate in the V2G request. The overall lifespan of the battery pack 34 may be expressed in terms of charge cycles. A charge cycle is the process of charging the battery pack 34 and discharging the battery pack 34 into a load. The term may be used to specify an expected life of the battery pack 34, as the number of charge cycles affects life more than the mere passage of time. Discharging the battery pack 34 fully before recharging may be called a "deep discharge", while partially discharging then recharging may be called "shallow discharge". Thus, a higher number of charge cycles may indicate a shorter lifespan for the battery pack 34.

In accordance with one embodiment, the criteria for determining whether a specific vehicle 12 may be eligible to participate in the V2G request may be based on a combination of the position of the vehicle 12 based on GPS coordinates (latitude and longitude) to determine if the vehicle 12 is in the utility service area and discharge date of the vehicle 12 located in the V2G request area. For example, as may be seen in FIG. 5, the V2G request may be limited to vehicles 12 having charge cycles below a predetermined number for a particular time frame (i.e. less than 30 charge cycles for the current month). Thus, the V2G request may try and prolong the lifetime of the battery pack 24 by limiting the number of times vehicles 12 may participate in the V2G request (i.e., discharge event) and hence try and limit the number of charge cycles of the battery pack 34.

As depicted in FIG. 5, which may be representative of the database stored on the server 22 (FIG. 1), the vehicles identified as N2109 and C2120 are at 30 and 35 charge cycles for the current month. Thus, based on the criteria of less than 30 charge cycles for the current month in order to be eligible to participate in the V2G request, the vehicles identified as H9857 and T9210 may be eligible to participate while the vehicles identified as N2109 and C2120 may not be eligible to participate in the V2G request.

Figure 6:
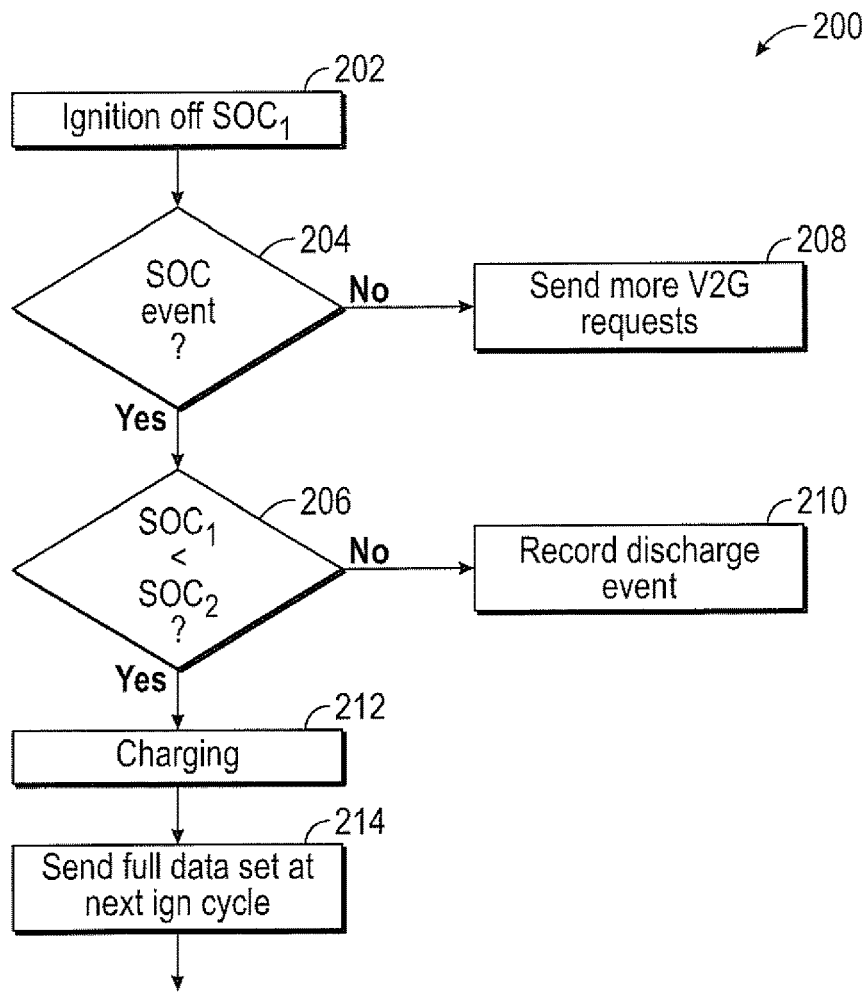
FIG. 6 is an exemplary flowchart depicting a method for determining discharge events for the vehicles depicted in FIG. 1 according to one aspect of the present application.

Referring now to FIG. 6, a flowchart may be seen showing how the control system 30 (FIG. 2) of the vehicles 12 (FIG. 1) may determine discharge events. The sensors 32 (FIG. 2) of the control system 30 may monitor the State of Charge 1 ($SOC_1$) of the battery pack 34 (FIG. 2) when the ignition is turned off (block 202). The sensors 32 may indicate if a SOC event has occurred (block 204). If no SOC event has occurred (block 204 is No), more V2G requests may be sent (block 208) if the vehicles 12 meets the technical criteria of the V2G request. If a SOC event has occurred (block 204 is Yes), the control system 30 may make a determination (block 206) as to whether $SOC_1$ is greater than $SOC_2$. If $SOC_1$ is not greater than $SOC_2$ (block 206 is No) than a discharge event may be recorded (block 210). If $SOC_1$ is greater than $SOC_2$ (block 206 is Yes) than this may be indicative that the vehicle 12 is charging (block 212) and a full data set may be sent to the monitoring facilities 20 at the next ignition cycle.

Figure 7:
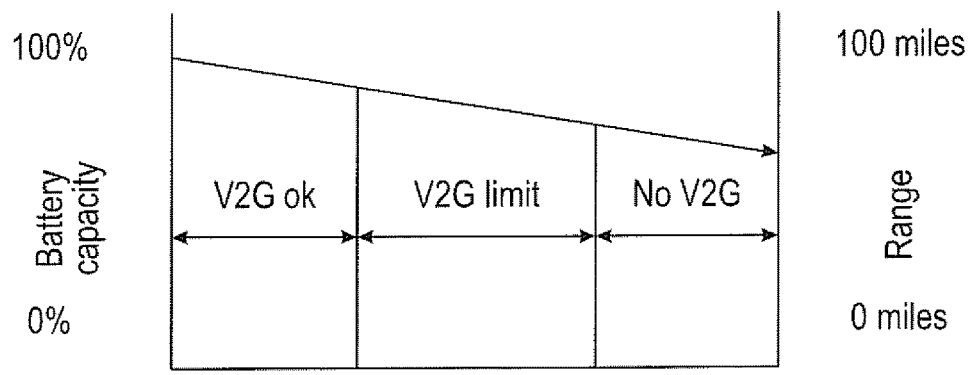
FIG. 7 is a graphical representation illustrating degradation of a battery for a vehicle versus V2G participation according to one aspect of the present application.

In accordance with one embodiment, the criteria for determining whether a specific vehicle 12 (FIG. 1) may be eligible to participate in the V2G request may include the condition of the battery pack 34 (FIG. 2). As shown in FIG. 7 the ability for the battery pack 34 to hold a charge, as well as maximum charge level degrades over time with the age of the battery pack 34 and with each charge/discharge cycle. To extend the lifetime of the battery pack 34, it may be desirable for the control system 30 to monitor the battery pack 34 to avoid full charging, deep discharging, quick charges, and charging in weather conditions that may be adverse to the battery pack 34 (i.e., temperatures either hotter or colder than the recommended charging temperature). Monitoring the above may help to minimize battery pack degradation as the battery pack degradation lowers the maximum vehicle travel range. In addition ambient temperature and other factors contribute to reduce the range of the vehicle 12.

Referring to FIG. 8, a table shows the maximum range for vehicles 12 (FIG. 1) under a full charge, current state of charge and estimated charging time. This data may be sent to and recorded in the database on the server 22 (FIG. 1). The table shows the range of the vehicle identified as N2109 may have degraded since the maximum range of the vehicle identified as N2109 is 20 miles less than that of the of the next closest vehicle 12 in the database. The table shows that the battery pack 24 (FIG. 2) of the vehicle identified as C2120 may have degraded since the estimated charge time is almost an hour longer than that of the next closest vehicle 12 in the database. Thus, the vehicles identified as N2109 and C2120 may not be eligible for the V2G request while the vehicles identified as H9857 and T9210 may be eligible to participate.

The above example shows that the number of V2G charge and discharge cycles may be reduced to minimize any further degradation of the battery pack 34 by not sending the V2G request to certain vehicles 12. If a utility company 24 (FIG. 1) directly issues the V2G request to a vehicle owner directly, the vehicle owner may communicate to the utility company that the OEM manufacturer recommends to limit or reduce the number of V2G charge and discharge cycles, where the manufacturer sets the criteria and limits for the vehicle owner.

Historical data may be used to increase precision of V2G request. The historical data may be related to the utility company 24 and or the vehicle 12. For the utility companies 24, historical data related to power consumption of the utility companies may be analyzed. For example, seasonal conditions may alter power consumption (i.e., higher power usage during warmer summer months). For the vehicle 12, historical data that may affect the life of the battery pack 34 may be analyzed. This historical data may include, but is not limited to: operating temperature of the vehicle 12 or ambient temperature where the vehicle 12 is operated, the number of discharge cycles and or deep discharging of the battery pack 34, frequency of usage of the vehicle 12, the number of short trips made by the vehicle 12, the number of quick charges made to the battery pack 34, the number or length of full charging of the battery pack 34, or other criteria that may accelerate the battery degradation. A historical database may be used to maximize V2G participation, preserve the lifetime of the battery packs 34 and communicate to electric utility companies 34 the amount of electric power the vehicles 12 may contribute with minimal battery pack degradation. The information provided may allow the utility companies to calculate the V2G load they may depend on from the vehicles 12.

In accordance with one embodiment, the location and historical data related to the maximum number of V2G cycles per month and year to date (ytd) may be used as criteria for determining participation in the V2G request. Referring to FIG. 9, a table which may be stored on the server 22 (FIG. 1) discloses a maximum number of V2G cycles per month and year to date (ytd) for certain vehicles 12 (FIG. 1). The vehicles 12 identified as T9210 and C2120 have both exceeded the maximum number of V2G cycles per month. Thus, vehicles 12 identified as T9210 and C2120 may not participate in the V2G request so as to reduce battery degradation. While the vehicle 12 identified as N2109 has not exceeded the monthly or yearly maximum number of V2G cycles, the vehicle 12 identified as N2109 may not participate in the V2G request since the SOC does not exceed 50%. Thus, only the vehicle 12 identified as H9857 may participate in the V2G request since it has not exceeded the monthly or yearly maximum number of V2G cycles and the current SOC exceeds 50%.

Referring to FIG. 10, a table which may be stored on the server 18 (FIG. 1) is shown which discloses different historical data which may be used to determine V2G participation. The table shows columns of criteria with the vehicles 12 (FIG. 1) grouped by month. The columns may have different historical data such as discharge temperature, discharge amount, number of V2G discharge cycles, % degradation of the battery pack 34 (FIG. 2) and total amount of degradation of the battery pack 34. If there is a limit to hold V2G request to 30 cycles/month with max discharge of certain amount of lows, then vehicles 12 may be identified that are on pace to exceed this threshold. The OEM may then communicate to the owners the reason for reducing or stopping V2G participation.

Historical data may be used as a prediction data strategy. For example, a historical database on the server 18 of total V2G capacity may be used to identify a quantity of available energy for each day. This information may be sent to utility companies 24 (FIG. 1) or aggregators working on behalf of the utility companies 24 in a geographic region where the historical data may have been collected. Furthermore, the remaining V2G cycles per vehicle 12 per location, as well as the GPS location and charge amount may be given to the utility companies for forecasting purposes on a weekday, a weekend, and a seasonal basis relative to ambient temp, solar, scheduled maintenance, etc. Thus, rather than have utility companies send out the V2G request and hope to get responses, the prediction data strategy may allow the utility companies to know in advance what amount of energy is available for forecasting purposes.

Embodiments of the prediction data strategy method may maximize V2G participation and communicate to utility companies 24 the amount of power that OEMs may contribute. Embodiments of the prediction method may allow utility companies 24 to calculate the V2G load they may depend on from the OEMs. The potential for higher revenue to vehicle owners may be realized as supply charge amount, location, day/season breakdown to utility companies for planning purposes. Embodiments of the prediction method may be proactive and not reactive for V2G planning purposes.

The foregoing description is illustrative of particular embodiments of the application, but is not meant to be a limitation upon the practice thereof. The following claims, including all equivalents thereof, are intended to define the scope of the application.

What is claimed is:

1. A method for sending a vehicle-to-grid (V2G) request comprising:
   receiving a V2G request for a specific geographical region;
   determining which of a plurality of vehicles are in the specific geographic region;
   determining, based on historical data of the plurality of the vehicles and at least one of a number of discharge cycles and a frequency of usage, a subset of the plurality of vehicles located in the specific geographic region to discharge electrical energy stored therein; and
   sending a signal to the subset of the plurality of vehicles to cause the subset of the plurality of vehicles to discharge the stored electrical energy.

2. The method of claim 1, comprising forecasting an amount of energy that the plurality of vehicles can provide to utility companies or aggregators acting on behalf of the utility companies in the specific geographic region based on the historical data.

3. The method of claim 2, comprising notifying the utility companies in the specific geographic region of the amount of energy forecasted.

4. The method of claim 1, comprising communicating to at least one of the plurality of vehicles to prevent the discharging of electrical energy based on the historical data to prevent battery degradation.

5. The method of claim 1, wherein determining a subset of the plurality of vehicles is further based on at least one of: an operating temperature, State of Charge (SOC), a number of trips below a predefined mileage, a vehicle range based on a fully charged battery pack, or condition and degree of degradation of the battery pack.

6. The method of claim 5, wherein a minimum required current SOC is at least 50% of a full charge.

7. The method of claim 5 wherein if the vehicle range based on a fully charged battery pack is less than a defined threshold, the number of discharge cycles exceeds a defined limit, or the condition and degree of degradation of the battery pack exceeds a defined threshold, the vehicle is ineligible to join the V2G request.

8. The method of claim 1, comprising:
verifying contributions of stored energy from each of the subset of the plurality of vehicles to the electric grid; and
recording the contributions in a database.

9. A system for vehicle-to-grid (V2G) priority based selection comprising:
a network configured for communication among one or more utility companies, a vehicle company, and a plurality of vehicles manufactured by the vehicle company;
at least one server with a database containing information for the plurality of vehicles, wherein the at least one server has a processor configured to access the database and to execute a set of program instructions causing the processor to:
receive a V2G request for a specific geographical region;
determine a subset of a plurality of vehicles that meet at least one of a plurality of criteria to discharge electrical energy stored therein, wherein the plurality of criteria includes at least one of a number of discharge cycles and a frequency of usage, wherein current and historical data of the plurality of vehicles determines eligibility for the V2G request; and
send a signal to the subset of the plurality of vehicles to cause the subset of the plurality of vehicles to discharge the stored electrical energy.

10. The system of claim 9, wherein determining the subset of the plurality of vehicles is further based on at least one of: an operating temperature, a current vehicle location, State of Charge (SOC), a number of trips below a predefined mileage, a vehicle range based on a fully charged battery pack, or degree of degradation of the battery pack.

11. The system of claim 10, wherein the program instructions executed by the processor, causes the processor to determine ineligibility to join the V2G request when the current location is outside a predefined boundary and at least one of: the vehicle range based on a fully charged battery pack is less than a defined threshold, the number of discharge cycles exceeds a defined limit, or the degree of degradation of the battery pack exceeds a defined threshold, the vehicle is ineligible to join the V2G request.

12. The system of claim 9, wherein the program instructions executed by the processor, causes the processor to forecast an amount of energy that the plurality of vehicles can provide to the utility companies or aggregators on behalf of the utility companies in the specific geographic region based on the current and historical data.

13. The system of claim 9, wherein the program instructions executed by the processor, causes the processor to notify the utility companies or the aggregators on behalf of the utility companies in the geographic region of the amount of energy forecasted.

14. The system of claim 9, wherein the program instructions executed by the processor, causes the processor to communicate to at least one of the plurality of vehicles to limit V2G participation based on the current and historical data to prevent further battery degradation.

15. A method for a vehicle-to-grid (V2G) priority based selection comprising:
receiving a request for a plurality of vehicles manufactured by a vehicle company based on a geographic region;
reviewing a database of last known vehicle status to determine a last known position for each of the plurality of vehicles in the database;
determining which of the plurality of vehicles are in the geographic area specified in the request;
determining a subset of the plurality of vehicles that are in the geographic area that meet at least one of a plurality of criteria established by the vehicle company to reduce battery degradation including a number of discharge cycles and a frequency of usage, wherein current and historical data is used to determine the subset;
sending a signal to cause the subset to discharge electrical energy stored in the subset of the plurality of vehicles and
communicating to at least one of the plurality of vehicles to prevent the discharging of electrical energy based on the current and historical data of the at least one of the plurality of vehicles to prevent further battery degradation.

16. The method of claim 15, comprising:
forecasting an amount of energy that the plurality of vehicles can provide to utility companies or aggregators on behalf of the utility companies in the geographic region based on the historical data; and
notifying the utility companies or aggregators on behalf of the utility companies in the geographic region of the amount of energy forecasted.

17. The method of claim 15, wherein determining the subset of the plurality of vehicles is further based on at least one of: an operating temperature, a current vehicle location, State of Charge (SOC), a number of trips below a predefined mileage, a vehicle range based on a fully charged battery pack, or condition and degree of degradation of the battery pack.

18. The method of claim 17 wherein if the vehicle range based on a fully charged battery pack is less than a defined threshold, the number of discharge cycles exceeds a defined limit, or the condition and degree of degradation of the battery pack exceeds a defined threshold, the vehicle is ineligible to join the V2G request.

19. The method of claim 15, further comprising:
verifying contributions of stored energy from each of the subset of the plurality of vehicles to the electric grid; and
recording the contributions in a database.

* * * * *